Jan. 7, 1958  L. S. WILLIAMS  2,818,769
OPTICAL PROJECTION SYSTEM FOR WEIGHING SCALE INDICATION
Filed Oct. 25, 1954  3 Sheets-Sheet 1
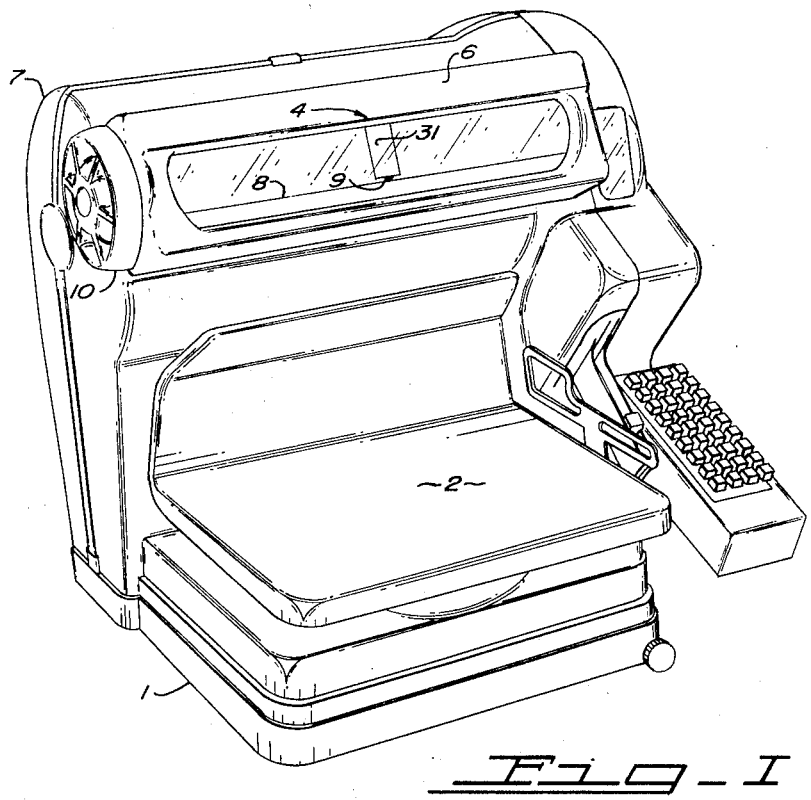
Fig. I
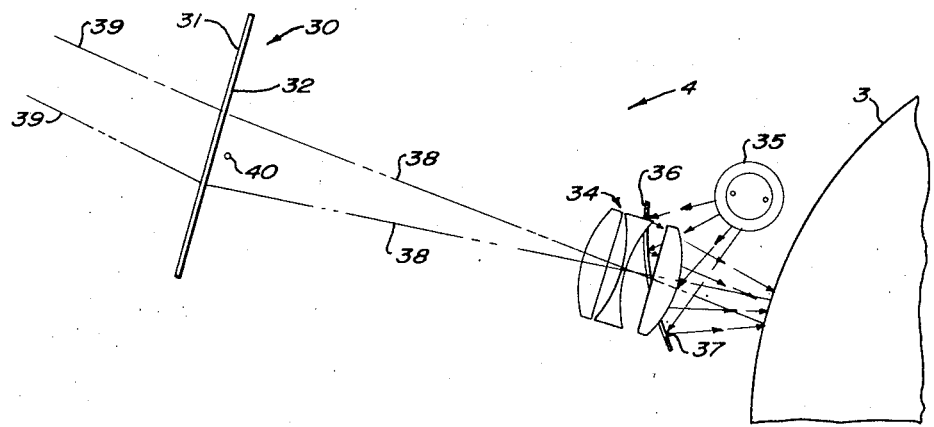
Fig. IV
INVENTOR.
LAWRENCE S. WILLIAMS
BY
Marshall, Marshall & Yeasting
ATTORNEYS Jan. 7, 1958 L. S. WILLIAMS 2,818,769
OPTICAL PROJECTION SYSTEM FOR WEIGHING SCALE INDICATION
Filed Oct. 25, 1954 3 Sheets-Sheet 2
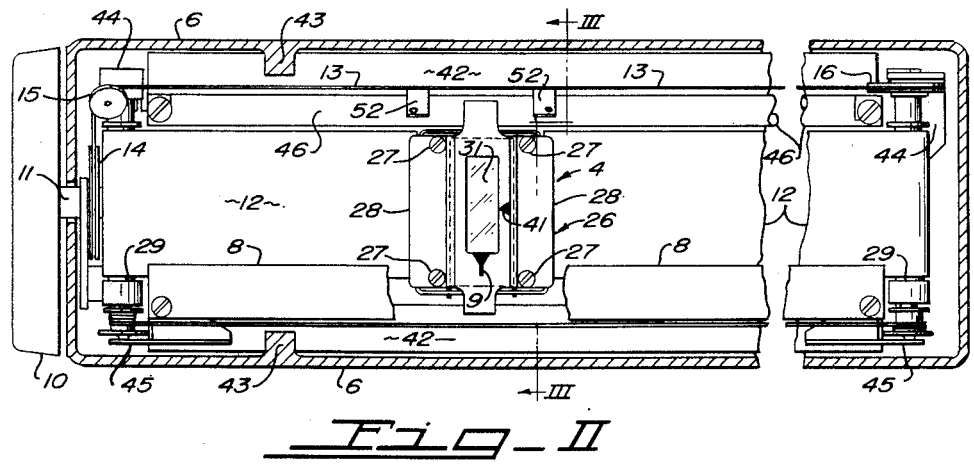
Fig. II
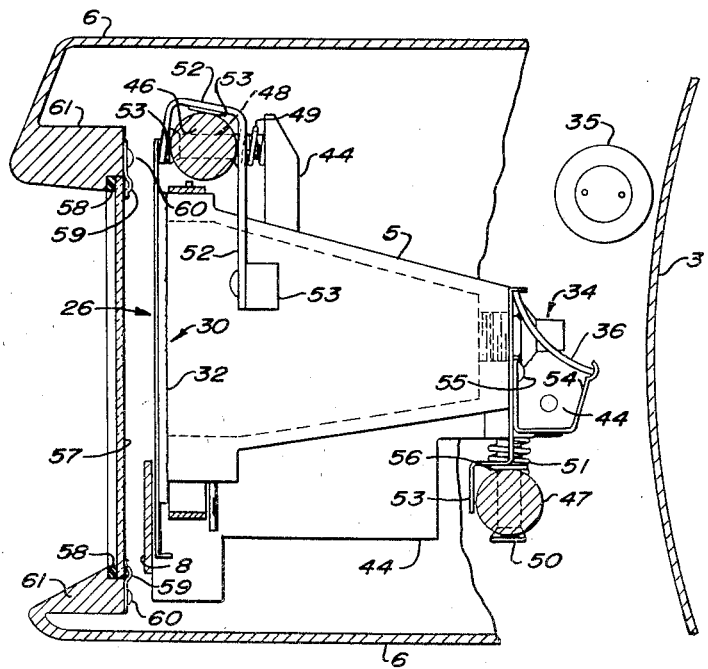
Fig. III
INVENTOR.
LAWRENCE S. WILLIAMS
BY
Marshall, Marshall & Yeasting
ATTORNEYS

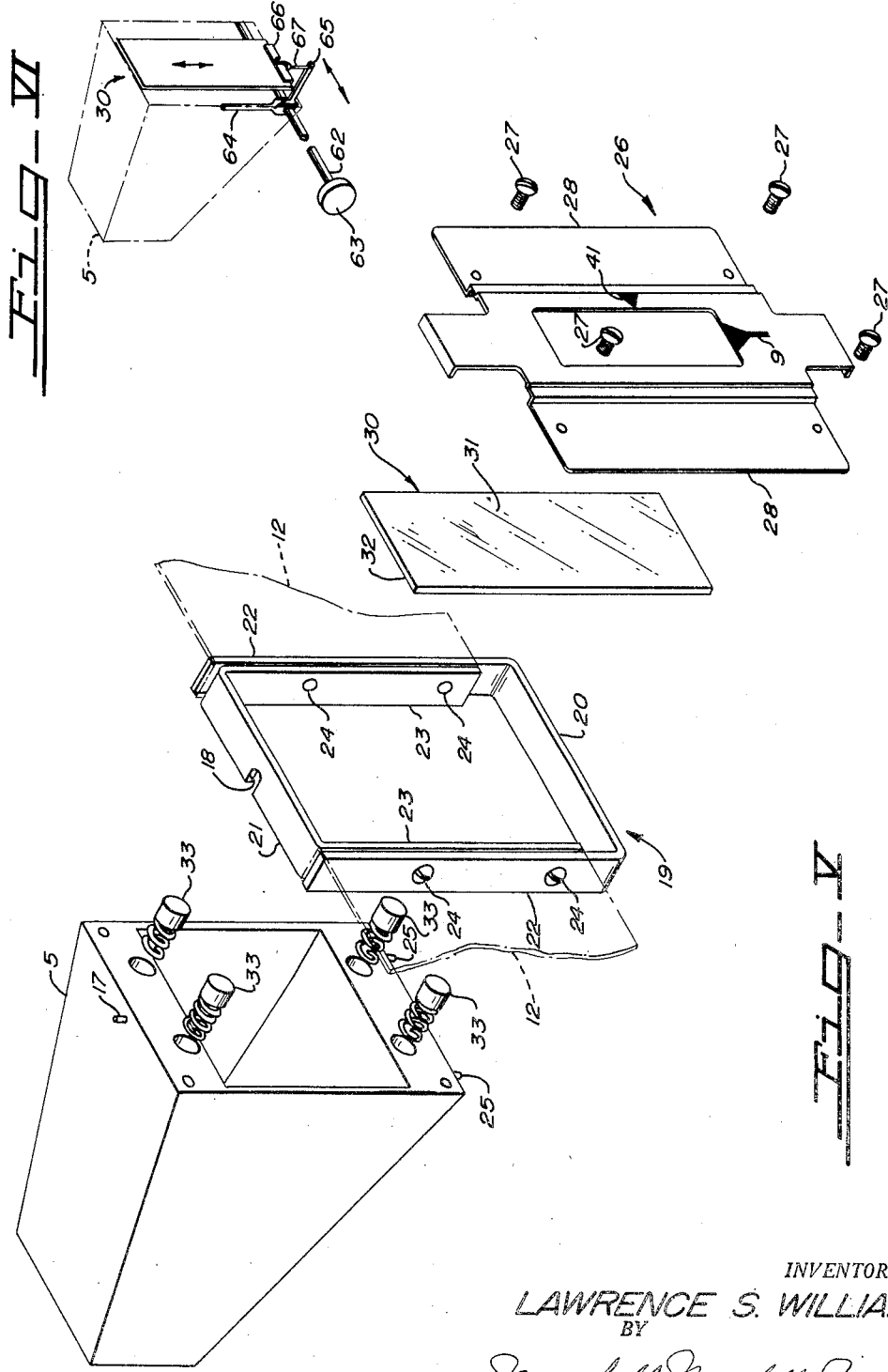

United States Patent Office 2,818,769
Patented Jan. 7, 1958

2,818,769

OPTICAL PROJECTION SYSTEM FOR WEIGHING SCALE INDICATION

Lawrence S. Williams, Toledo, Ohio, assignor to Toledo Scale Company, Toledo, Ohio, a corporation of New Jersey Application October 25, 1954, Serial No. 464,210

3 Claims. (Cl. 88—24)

This invention relates to weighing scales and in particular to means for optically projecting images of indicia in a system for displaying indications of load on a weighing scale.

Most computing scales, for example those used in retail stores, are of the cylinder type because of the great area available on the surface of a cylindrical chart for the display of computed values. Such a chart is rotatable and has computed value indicia arranged in columns according to price. In order to provide a sufficient number of indicia to cover the commonly used prices throughout the weighing capacity of the scale, the individual indicia must be quite small and it is common practice to mount an optical system from the housing and aligned with the observer's line of vision for providing enlarged virtual images of the area to be displayed.

When the area to be displayed includes indicia computed according to today's high prices, the indicia are necessarily very small and very closely spaced, since the surface of the chart is limited by practical reasons of size and weight. Heretofore, a lens of very high magnifying power or several lenses have been used to greatly increase the apparent size of the indicia on the cylindrical chart to an easily readable size. The best of such optical systems has several marked disadvantages. The maximum magnifying power is limited so that it has never been possible to include a sufficient number of indicia on the cylindrical chart to cover all of the commonly used prices. Also, the enlarged virtual images of the area displayed are seen by an observer as though at the end of a tunnel which makes impossible wide angle viewing.

Heretofore, attempts have been made to optically project images of the indicia on the cylindrical chart onto a screen in efforts to produce a satisfactory optical system which would have the advantages of wide angle viewing of a very large number of computed amount figures. Such attempts have failed. One reason for the failures was that it was impossible to satisfactorily illuminate the area to be displayed so that brilliant images could be projected and another reason was that it was impossible to provide satisfactory means for zero adjusting and focusing the projection system.

The principal object of this invention is to provide a weighing scale in which enlarged and brilliant images of indicia on a computing chart are projected onto a display screen to permit a very large number of computed amount figures easily to be seen from wide angle positions.

More specifically, it is the principal object of this invention to provide, in a weighing scale, an optical projection system having a projection lens of high magnification power viewing the area to be displayed through an aperture in a concave cylindrical mirror whereby it is possible to project very large and very brilliant images of the area to be displayed onto an opaque display screen.

Another object of the invention is to provide means for easily and accurately focusing and zero adjusting the optical projection system.

A further object of the invention is to provide an improved opaque display screen for the optical projection system and means for providing independent vertical movement of the screen.

More specific objects and advantages are apparent from the following description of a preferred embodiment of the invention.

According to the invention, a viewing assembly including an improved opaque display screen, which is independently vertically movable, and a projection lens is movable along a path parallel to the surface of a rotatable indicia bearing chart. Novel means for illuminating the area to be displayed is provided and includes an apertured concave cylindrical mirror through which the projection lens views the area to be displayed. The mirror is so oriented that a bundle of nearly parallel rays of light passes from the area to be displayed to the projection lens whereby brilliant images are projected. Means are also provided for easily and accurately positioning the viewing assembly relative to the chart so that the optical system is properly focused and correctly aligned with the zero reading on the chart in all positions of the optical system in the path parallel to the surface of the chart.

A preferred embodiment of the invention is illustrated in the accompanying drawings:

In the drawings:

Figure I is a perspective view of a computed value weighing scale having means for optically projecting images of indicia on a cylindrical chart onto a display screen.

Figure II is a front elevational view, partly in section, of the upper part of the weighing scale shown in Figure I illustrating a viewing assembly.

Figure III is a sectional view taken substantially along the line III—III of Figure II.

Figure IV is a schematic view of a light source, a rotatable indicia bearing chart, and the optical projection system.

Figure V is an isometric exploded view showing a lens carrier and a display screen.

Figure VI is a schematic view of the lens carrier and the display screen showing means for vertically adjusting the screen.

These specific drawings and the accompanying description are intended merely to illustrate the invention but not to limit its scope.

A weighing scale equipped to print weight, price and value tickets and incorporating the instant invention comprises a base 1 in which is mounted a lever system supporting a load receiver 2. Conventional load counterbalancing mechanism is erected from the base and is operatively connected to the lever system and drivingly connected to a rotatable indicia bearing chart 3. The chart 3 has a plurality of columns of indicia representing the value of commodities on the load receiver 2 computed according to various prices, there being a column for each price. The value indicia are displayed to an operator by means of a viewing assembly or optical projection system 4 movable along a path parallel to the surface of the chart 3.

The viewing assembly 4 is carried by a lens carrier 5 slidable within a housing 6 positioned on the upper forward portion of a scale frame 7 and extending along the chart 3. A price chart 8 fixedly mounted within the housing 6 cooperates with an index 9 carried by the slidable lens carrier 5 to identify the proper one of the columns of value indicia on the rotatable chart 3. The lens carrier 5 is traversed horizontally along the rotatable chart 3 by manipulation of a handwheel 10 carried on a shaft 11 extending from the end of the housing 6. Flexible opaque curtains 12 extend along the path of the lens carrier 5 to conceal those portions of the chart 3 not in the field of view of the viewing assembly 4.

The handwheel 10 is drivingly connected to the lens carrier 5 by means of a cord 13. The cord 13 extends in a continuous looped path from a drive pulley 14, around a pair of small idler pulleys 15, only one of which is shown in Figure II, and around a large idler pulley 16. The cord 13 is attached to the lens carrier 5 so that rotation of the handwheel 10 traverses the lens carrier along a path parallel to the surface of the chart 3. Protruding from the top of the lens carrier 5 is a pin 17 (Figure V) which fits into a notch 18 in a rectangular curtain support 19 surrounding the front of the lens carrier 5. The support 19 includes U-shaped elements 20 and 21 one of which fits inside the other. Between upwardly extending legs 22 of the element 20 and downwardly extending legs 23 of the element 21, end portions of the curtains 12 are confined. The curtains 12 and the elements 20 and 21 are held securely together by means of screws 24. Two posts 25 protrude from the bottom of the lens carrier 5 against which the bight of the lower U-shaped element 20 rests to permit the support 19 to have a floating action. The posts 25 also function as stops to keep the support 19 from tilting inwardly at the bottom of the lens carrier 5. The support 19 is prevented from sliding forward and off of the lens carrier by a winged fenestral frame 26 and screws 27 which hold the frame close to the front side of the lens carrier 5. Wings 28 of the fenestral frame 26 extend to either side of the frame to prevent the curtain support 19 from sliding forward and disengaging the notch 18 from the pin 17. The only driving connection between the lens carrier 5 and the curtain support 19 is through the pin 17 and the notch 18. This single pin and notch connection allows the curtains 12 to stretch unevenly and allows spring loaded curtain take up spools 29 to be out of parallel without causing the lens carrier 5 to tilt.

The viewing assembly or optical projection system 4 is carried by the slidable lens carrier 5 and includes an opaque member or display screen 30 having a viewing screen 31 with a uniform frosted surface obtained by grit vapor blasting on its one side and a Fresnel lens 32 on its other side. The display screen 30 is held snugly in place by means of tension slugs 33 (Figure V) seated in the lens carrier 5, which slugs press the display screen against the inside of the frame 26.

The viewing assembly or optical projection system 4 also includes a projection lens 34 extending through and fixed in an opening in the back of the lens carrier 5 (Figure III) for projecting onto the display screen 30 images of indicia on the chart 3 within the field of view of the projection lens. An elongated light source 35 is suitably mounted within the housing 6 and extends along the path of the viewing assembly and adjacent the chart 3. The position of the light source 35 is necessarily such that direct rays of light from the light source strike the area to be displayed on the chart 3 at oblique angles and are reflected by the chart at angles such that much of the light would be lost to the projection lens 34 without the aid of a reflector. Heretofore, it has been impossible to satisfactorily illuminate the area to be displayed.

A novel reflector is provided according to the present invention to focus light from the light source 35 onto the chart in the field of view of the projection lens 34. The reflector consists of an apertured concave cylindrical mirror 36 carried on the lens carrier 5 and so oriented that light from the light source 35 is focused by the mirror onto the chart 3 so that a bundle of nearly parallel rays of light passes from the area to be displayed to the projection lens, which views the chart 3 through an aperture 37 in the mirror 36, as shown schematically in Figure IV, whereby brilliant images are projected. Greatly magnified images of the indicia on the chart 3 are projected by the lens 34 to permit a very large number of computed amount figures to be seen on the display screen 30— more figures than have heretofore been seen through conventional optical systems showing virtual images of the area to be displayed. Since the optically projected images of the indicia within the field of view of the projection lens are seen by an observer on the display screen 30 instead of at the end of a tunnel as are the virtual images produced by conventional optical systems, the optically projected images can be seen from wide angle positions.

As shown schematically in Figure IV, light is directed from the light source 35 onto the apertured mirror 36 from where it is focused onto the area to be displayed on the chart 3 just as though the projection lens 34 is the light source. A bundle of nearly parallel rays of light passes from the area to be displayed on the chart 3 to the projection lens 34 which projects an image of the indicia within its field of view onto the display screen 30. The Fresnel screen 32 straightens out diverging rays of light 38 coming from the projection lens 34 so that an observer sees an image on the viewing screen 31 comprising a parallel bundle of rays 39. When the observer sees the image of the indicia on the viewing screen 31, he also sees a shadow of a reading line 40 which may be a stretched cord, thread or a fine stretched wire positioned closely adjacent the display screen 30, as shown in Figure IV. The reading line 40 appears to the observer to be directly on the viewing screen 31 at the point of an indicator mark 41 painted on the frame 26.

The housing 6 contains and supports a rigid rectangular frame comprising lower and upper horizontally extending bars 42 attached to bosses 43 formed within the housing and two end plates 44 fixed to the horizontal bars. The tops of the end plates 44 support the upper ends of the curtain take up spools 29, the lower ends of the spools being supported by flat ears 45 connected to the end plates 44. A pair of guide rods 46 and 47 within the housing 6 and extending substantially parallel to the surface of the chart 3 are provided and function as a trackway along which the lens carrier 5 is slidable. The guide rod 46 is attached to the upper part of each end plate 44 and extends between the plates. As shown in Figure III, the guide rod 46 is attached by means of screws 48, only one of which is shown, there being a spring 49 surrounding each screw 48 and compressed between the guide rod 46 and the top of the end plate 44. The guide rod 47 is attached to the bottom of the rearmost portion of each end plate 44 and extends between the plates. As shown in Figure III, the guide rod 47 is attached by means of screws 50, only one of which is shown, there being a spring 51 surounding each screw 50 and compressed between the guide rod 47 and the end plate 44.

The lens carrier 5 is suspended from two points of the guide rod 46 by means of hooks 52 fastened to a boss 53 on the lens carrier. Each hook 52 is equipped with a pair of bearing buttons 53 which are slidable along the guide rod 46. The lens carrier 5 carries a reflector bracket 53 and a reflector retainer clip 54 attached to the carrier by means of a screw 55. The lens carrier 5 bears on one point of the guide rod 47 through a bearing button 56 fixed to the reflector bracket 53. When the handwheel 10 is rotated, the lens carrier 5 is traversed along the guide rods 46 and 47, three points only of the lens carrier sliding on the guide rods, i. e., two points at the hooks 52 and one point at the reflector bracket 53. The reflector retainer clip 54 holds the mirror 36 in place on the back of the lens carrier 5. A glass window 57 is pressed against soft rubber gaskets 58 by a plurality of clips 59 held in place by screws 60 threaded into abutments 61 formed around the forward edge of the housing 6.

The screws 48 and their cooperating springs 49 are adjustment means to position the guide rod 46 in parallel relationship to the chart 3 in a location properly distant from the chart 3 for focusing the optical projection system 4. The screws 50 and their cooperating springs 51 are positioning means to adjust the guide rod 47 in horizontally parallel relationship to the chart 3 for vertical zero adjustment of the optical projection system 4.

Referring to Figure VI, means may be provided for making the display screen 30 vertically adjustable to accommodate various heights of operators. When the display screen 30 is at the proper elevation, an observer sees a brilliant image all parts of which are of equal brightness. However, a shorter or taller man will see a brilliant image having one part darker than the other. Vertical adjustment of the display screen 30 remedies this situation. A keyed shaft 62 is suitably mounted in the housing 6 and extends parallel to the chart 3. A knob 63 on the shaft is located on the outside of the scale frame 7. When the lens carrier 5 is traversed along the guide rods 46 and 47, it also slides along the keyed shaft 62 upon a bracket 64 fixed to the lens carrier 5. The bracket 64 has a pair of spaced apart legs through which the keyed shaft 62 freely passes and between which an arm 65 having a keyway is slidably mounted on the shaft 62. When the knob 63 is turned, the keyed shaft 62 drives the arm 65 up or down which raises or lowers the display screen 30 attached to the free end of the arm 65 by means of a U-shaped screen holder 66 and a link 67 extending between the arm and the holder.

Various modifications may be made in specific details of construction without departing from the spirit and scope of the invention.

Having described the invention, I claim:

1. In a system for displaying indications of load on a weighing scale, in combination, a housing, a rotatable indicia bearing chart, a pair of guide rods within the housing extending substantially parallel to the surface of the chart, a slidable lens carrier suspended from two points of one of the guide rods and bearing on one point of the other guide rod, an optical projection system carried by the lens carrier and comprising a member having a viewing screen on its one side and a Fresnel lens on its other side and a projection lens for projecting onto the screen images of indicia in the field of view of the projection lens, a light source extending along the path of the lens carrier and adjacent the chart, and an apertured concave cylindrical mirror carried on the lens carrier and adapted to focus light from the light source onto the chart in the field of view of the projection lens, the projection lens viewing the chart through the aperture of the mirror, adjustment means to position one guide rod in parallel relationship to the chart and in a location properly distant from the chart for focusing the optical system, and positioning means to adjust the other guide rod in horizontally parallel relationship to the chart for vertical zero adjustment of the optical system.

2. In a system for displaying indications of load on a weighing scale, in combination, a housing, a rotatable indicia bearing chart, a pair of guide rods within the housing extending substantially parallel to the surface of the chart, a slidable lens carrier suspended from two points of one of the guide rods and bearing on one point of the other guide rod, an optical projection system carried by the lens carrier and comprising a display screen and a projection lens for projecting onto the screen images of indicia in the field of view of the projection lens, a light source extending along the path of the lens carrier and adjacent the chart, and an apertured concave cylindrical mirror carried on the lens carrier and adapted to focus light from the light source onto the chart in the field of view of the projection lens, the projection lens viewing the chart through the aperture of the mirror, adjustment means to position one guide rod in parallel relationship to the chart and in a location properly distant from the chart for focusing the optical system, and positioning means to adjust the other guide rod in horizontally parallel relationship to the chart for vertical zero adjustment of the optical system.

3. In a system for displaying indications of load on a weighing scale, in combination, a housing, a rotatable indicia bearing chart, a plurality of guide rods within the housing extending substantially parallel to the surface of the chart, means for positioning the guide rods relative to the chart to provide zero and focusing adjustments, a slidable lens carrier mounted on the guide rods, three points only of the lens carrier sliding on the guide rods, an optical projection system carried by the lens carrier and comprising a viewing screen and a projection lens for projecting onto the screen images of indicia in the field of view of the projection lens, a light source extending along the path of the lens carrier and adjacent the chart, and an apertured concave cylindrical mirror carried on the lens carrier and adapted to focus light from the light source onto the chart in the field of view of the projection lens, the projection lens viewing the chart through the aperture of the mirror.

References Cited in the file of this patent

UNITED STATES PATENTS

| | | |
|---|---|---|
| 1,487,514 | Goss | Mar. 18, 1924 |
| 1,572,236 | Frederick | Feb. 9, 1926 |
| 1,788,712 | Foster | Jan. 13, 1931 |
| 1,984,561 | Zinke | Dec. 18, 1934 |
| 2,178,155 | Williams | Oct. 31, 1939 |
| 2,366,947 | Williams | Jan. 9, 1945 |
| 2,380,567 | Yawitz et al. | July 31, 1945 |
| 2,638,813 | Van Duyn | May 19, 1953 |
| 2,750,838 | Wells | June 19, 1956 |

U. S. DEPARTMENT OF COMMERCE

PATENT OFFICE

CERTIFICATE OF CORRECTION

Patent No. 2,818,769                                                 January 7, 1958

Lawrence S. Williams

It is hereby certified that error appears in the printed specification of the above numbered patent requiring correction and that the said Letters Patent should read as corrected below.

Column 1, line 69, strike out "an opaque" and insert instead -- a translucent --; column 2, lines 2 and 9, strike out "opaque", each occurrence, and insert instead -- translucent --; column 3, line 40, strike out "an opaque" and insert instead -- a translucent --.

Signed and sealed this 22nd day of April 1958.

(SEAL)
Attest:

KARL H. AXLINE
Attesting Officer

ROBERT C. WATSON
Commissioner of Patents